United States Patent
Kamiya et al.

(10) Patent No.: US 8,963,680 B2
(45) Date of Patent: Feb. 24, 2015

(54) CONTACTLESS COMMUNICATION METHOD AND SYSTEM

(75) Inventors: Masashi Kamiya, Kariya (JP); Masahiko Sato, Handa (JP); Kiyoshi Takahashi, Hekinan (JP); Takayuki Komatsu, Kariya (JP)

(73) Assignee: Denso Wave Incorporated, Aichi-pref. (JP)

(*) Notice: Subject to any disclaimer, the term of this patent is extended or adjusted under 35 U.S.C. 154(b) by 2043 days.

(21) Appl. No.: 11/185,756

(22) Filed: Jul. 21, 2005

(65) Prior Publication Data
US 2006/0020706 A1 Jan. 26, 2006

(30) Foreign Application Priority Data
Jul. 21, 2004 (JP) .................. 2004-212937

(51) Int. Cl.
*G06F 15/16* (2006.01)
*G06K 7/00* (2006.01)
*G06K 7/10* (2006.01)
*G07C 9/00* (2006.01)

(52) U.S. Cl.
CPC .......... *G06K 7/0008* (2013.01); *G06K 7/10039* (2013.01); *G07C 9/00007* (2013.01); *G07C 9/00309* (2013.01); *G07C 2209/10* (2013.01)
USPC ................. 340/5.21; 340/10.1; 340/572.1

(58) Field of Classification Search
USPC ............. 340/5.21, 5.22, 10.3, 5.1, 10.41; 235/380, 382
See application file for complete search history.

(56) References Cited

U.S. PATENT DOCUMENTS

| | | | | |
|---|---|---|---|---|
| 5,418,353 A | * | 5/1995 | Katayama et al. | 235/380 |
| 6,352,202 B2 | * | 3/2002 | Takiguchi et al. | 235/451 |
| 6,577,229 B1 | * | 6/2003 | Bonneau et al. | 340/10.41 |
| 6,809,636 B2 | * | 10/2004 | Metlitzky et al. | 340/426.11 |
| 7,075,412 B1 | * | 7/2006 | Reynolds et al. | 340/10.2 |
| 2004/0051631 A1 | * | 3/2004 | Metlitzky et al. | 340/426.11 |

FOREIGN PATENT DOCUMENTS

| | | |
|---|---|---|
| EP | 0 727 759 A1 | 8/1996 |
| EP | 0 744 708 A2 | 11/1996 |
| EP | 1 338 975 A1 | 8/2003 |
| JP | A-H09-146765 | 6/1997 |
| JP | A-2002-032827 | 1/2002 |
| JP | 2002-157038 | 5/2002 |

(Continued)

OTHER PUBLICATIONS

Office Action dated Feb. 3, 2009 in corresponding Japanese Patent Application No. 2004-212937 (and English translation).

(Continued)

*Primary Examiner* — Nabil Syed
(74) *Attorney, Agent, or Firm* — Posz Law Group, PLC

(57) ABSTRACT

In a contactless communication system, a first storage unit stores a group of access control programs corresponding to plural types of noncontact information carriers, respectively. A second storage unit stores access reference information required to execute the group of access control programs. A program execution unit refers to the access reference information to select at least one program in the group of access control programs based on the reference result. The program execution unit executes the selected at least one program in the group of access control programs based on the access reference information.

18 Claims, 5 Drawing Sheets

(56) References Cited

FOREIGN PATENT DOCUMENTS

| | | |
|---|---|---|
| JP | A-2003-067677 | 3/2003 |
| JP | A-2003-244320 | 8/2003 |
| WO | WO 01/006443 A1 | 1/2001 |

OTHER PUBLICATIONS

Preliminary Search Report and Written Opinion on Patentability of the Invention dated Jan. 30, 2012 in corresponding French Patent Application No.: FR 0507728 (and English translation).

* cited by examiner

CONTACTLESS COMMUNICATION METHOD AND SYSTEM

CROSS REFERENCE TO RELATED APPLICATION

This application is based on Japanese Patent Application 2004-212937 filed on Jul. 21, 2004 and claims the benefit of priority therefrom, so that the descriptions of which are all incorporated herein by reference.

BACKGROUND OF THE INVENTION

1. Field of the Invention

The present invention relates to contactless communication methods and systems capable of communicating with plural types of noncontact IC cards having different access procedures for communications therewith, respectively.

2. Description of the Related Art

Reader/writer systems have a reader/writer as a contactless communication device for carrying out radio data communications with noncontact information carriers, such as noncontact IC cards and noncontact IC tags. The reader/writer systems are controlled by an information processing unit, such as a computer, for executing application programs that allow the information processing unit to carry out information processing meeting applications of the reader/writer systems, such as user's needs.

A typical example of the reader/writer systems causes a reader/writer to wirelessly communicate with a noncontact IC card as a noncontact information carrier in response to an instruction output from a computer and to read out information, which corresponds to the instruction, stored in the noncontact IC card, thereby transferring the readout information to the computer.

For example, as disclosed in Japanese Unexamined Patent Publication No. 2002-157038, an application program 6a stored in a memory of a personal computer 3 sends a secret command to an IC card reader/writer 2 so that an OK command is transferred from the reader/writer 2. The OK command allows the application program 6a to cause the IC card reader/writer 2 to read/write data out/into an IC card 1.

As described above, a computer used to the reader/writer systems has a memory in which an application program is stored. The computer runs the application program so that the application program causes the reader/writer to execute radio data communications with noncontact IC cards. Specifically, when an event is generated in the computer, the application program causes the reader/writer to:

send, to a noncontact IC card, a request to return data corresponding to the event, to receive the data returned from the noncontact IC card;

receive the data returned from the noncontact IC card; and send the data to the computer.

That is, the application program causes the reader/writer to repeatedly execute the sending and receiving operations set forth above in response to occurrences of events.

This makes the application program considerably complicated.

In addition, there are plural types of noncontact IC cards, and they have different processing procedures and usable commands. This results in that the plural types of noncontact IC cards require a plurality of application programs meeting specifications of the plural types of noncontact IC cards.

SUMMARY OF THE INVENTION

The present invention has been made on the background above. Specifically, at least one preferable embodiment of the present invention provides noncontact communication method and system using a contactless communication device, which is capable of simplifying an application program causing an information processing unit to carry out information processing that meets at least one application of the contactless communication device.

According to one aspect of the present invention, there is provided a contactless communication system operative to communicate with at least one of plural types of noncontact information carriers based on control by an application program running on an information processing unit. The plural types of noncontact information carriers have different access procedures from type to type. The contactless communication system includes a first storage unit configured to store a group of access control programs corresponding to the plural types of noncontact information carriers, respectively. The contactless communication system includes a second storage unit configured to store access reference information required to execute the group of access control programs. The contactless communication system includes a program execution unit configured to refer to the access reference information to select at least one program in the group of access control programs based on the reference result in response to an access request sent from the information processing unit, The program execution unit is configured to execute the selected at least one program in the group of access control programs based on the access reference information.

According to another aspect of the present invention, there is provided a contactless communication system operative to communicate with at least one of plural types of noncontact information carriers. The plural types of noncontact information carriers have different access procedures from type to type. The contactless communication system includes a first storage unit configured to store a group of access control programs corresponding to the plural types of noncontact information carriers, respectively. The contactless communication system includes a second storage unit configured to store access reference information required to execute the group of access control programs; and a program execution unit configured to refer to the access reference information to select at least one program in the group of access control programs based on the reference result. The program execution unit is configured to execute the selected at least one program in the group of access control programs based on the access reference information.

According to a further aspect of the present invention there is provided a contactless communication method of communicating with at least one of plural types of noncontact information carriers. The plural types of noncontact information carriers have different access procedures from type to type. The method includes storing a group of access control programs corresponding to the plural types of noncontact information carriers, respectively, and storing access reference information required to execute the group of access control programs. The method includes referring to the access reference information to select at least one program in the group of access control programs based on the reference result; and executing the selected at least one program in the group of access control programs based on the access reference information.

BRIEF DESCRIPTION OF THE DRAWINGS

Other objects and aspects of the invention will become apparent from the following description of embodiments with reference to the accompanying drawings in which.

DETAILED DESCRIPTION OF EMBODIMENTS OF THE INVENTION

An embodiment and its modifications of the present invention will be described hereinafter with reference to the accompanying drawings.

Figure 1:
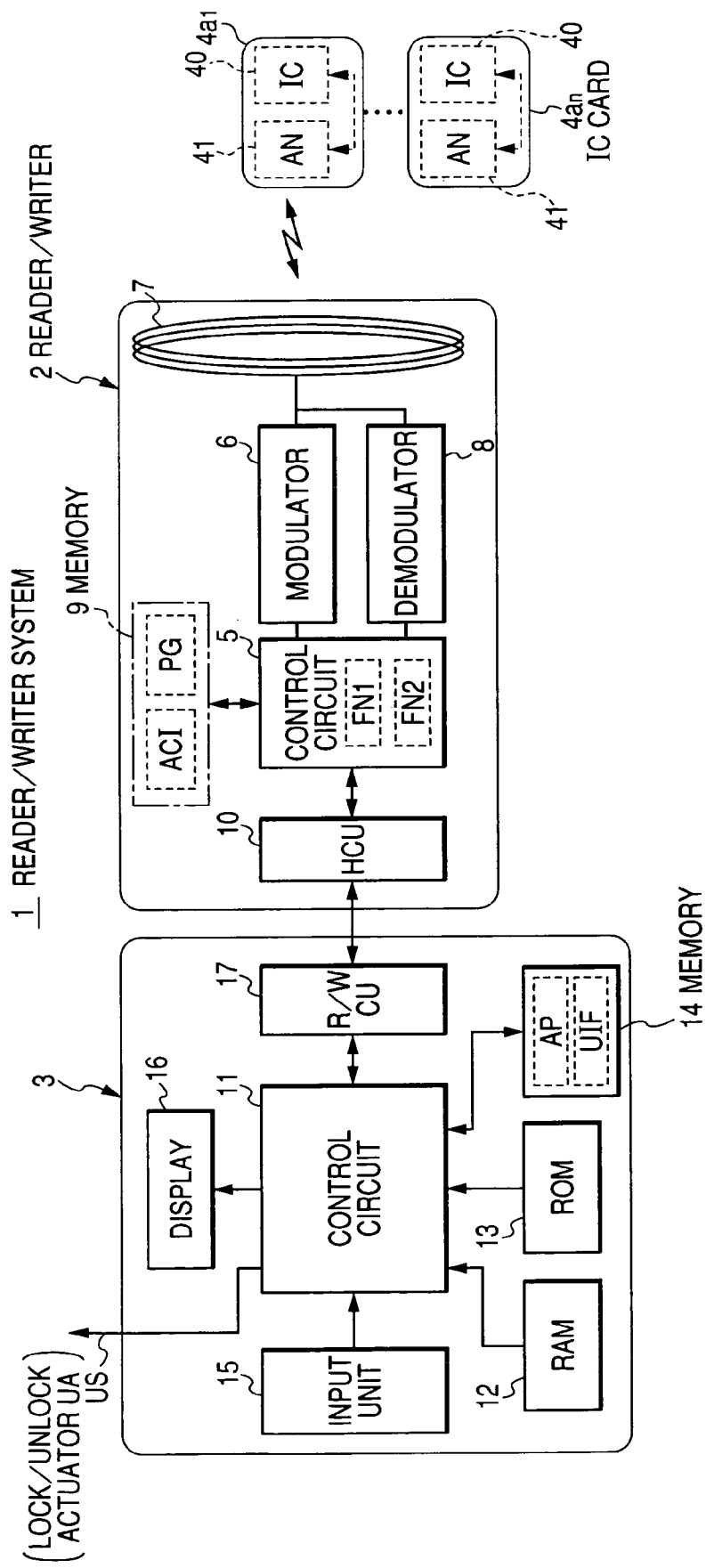
FIG. 1 is a block diagram illustrating an example of the functional configuration of a reader/writer system as a contactless communication system according to an embodiment of the present invention.

FIG. 1 illustrates an example of the functional configuration of a reader/writer system 1 as a contactless communication system according to an embodiment of the present invention. The reader/writer system 1 is used for authenticating plural types of, for example, n types of noncontact IC cards 4$a$1 to 4$an$, which have been registered in the system 1, to release the lock of a door of a room. The noncontact IC cards are referred to simply as "IC cards".

For example, the registered n types of cards 4$a$1 to 4$an$ include type-1 IC cards 4$a$1, type-2 IC cards 4$a$2, . . . , and type-n IC cards 4$an$. Specifications of the IC cards are different from type to type.

Note that "n" is an integer not less than 2 so that the reader/writer system 1 can authenticate two or more types of IC cards.

Specifically, the reader/writer system 1 is provided with a reader/writer 2 as a contactless communication device, and a computer 3 as a host apparatus with respect to the reader/writer 2.

The reader/writer 2 is equipped with a control circuit 5, a modulator 6, an antenna, such as a coil antenna, 7, and a demodulator 8. The modulator 6 and the demodulator 8 are connected to both the control circuit 5 and the antenna 7. The reader/writer 2 is equipped with a memory 9 connected to the control circuit 5, and a host communication unit 10 connected thereto. The host communication unit is abbreviated as HCU in FIG. 1.

The control circuit 5 is operative to execute overall control of the reader/writer 2. Specifically, the control circuit 5 has a CPU, and is communicable with the computer 3 through the host communication unit 10, For example, the control circuit 5 sends a high-frequency carrier signal (carrier wave). The modulator 6 is operative to modulate the carrier signal at given timings in accordance with data including, for example, at least one command and sent from the computer 3. In addition, the modulator 6 is operative to transmit, from the antenna 7, the carrier signal on part of which the data is superimposed.

The demodulator 7 is operative to amplify a return signal received by the antenna 7, which is transmitted from one of the IC cards 4$a$1 to 4$an$, and to detect and demodulate response data included in the return signal.

The memory 9 consists of, for example, a nonvolatile memory. The memory 9 has stored therein an access-control program group PG and access control information ACI in, for example, file formats, respectively. The access control information file ACI is designed to allow the control circuit 5 to:

specify an access procedure in the number of n-access procedures PR1 to PRn corresponding to the n types of the IC cards 4$a$1 to 4$an$, respectively; and obtain access information required to execute the specified access procedure.

In addition, each of the n types IC cards 4$a$1 to 4$an$ is embedded with an IC (IC chip) 40 and a transmitting/receiving antenna (AN), such as an antenna coil, 41 electrically connected to the IC 40. The IC 40 includes, for example, a rectifying circuit, a modem, a control circuit, and a memory, such as a nonvolatile memory.

The memory of the IC 40 of each IC card has stored therein attribute information in, for example, a file format. The attribute information includes conditions, such as a communication speed, required for the reader/writer 2 to access corresponding one of the IC cards 4$a$1 to 4$an$.

The memory of the IC 40 of some of the n types of IC cards 4$a$1 to 4$an$ also has stored therein authentication information, such as an authentication key, which has been uniquely determined by, for example, each of the card owners of some of the cards 4$a$1 to 4$an$.

In addition, the memory of the IC 40 of each IC card has unlock information, which has been uniquely determined by, for example, the card owner of each of the cards 4$a$1 to 4$an$.

In the embodiment, the logical file structure in each of the type-1 IC cards 4$a$1 has a hierarchical form. The hierarchical form of the file structure is composed of, for example, a first file MF as the root directory, a plurality of second files DFs under the first file MF; these second files DFs are subdirectories to the first file MF. The hierarchical form of the file structure is also composed of a plurality of third files EFs under the first file MF or each of the second files DFs; these third files EFs are subdirectories to the first file MF or each of the second files DFs.

In the embodiment, because each of the type-1 IC cards 4$a$1 has the file structure set forth above and requires authentication, the authentication information of each type-1 IC card has been stored in a third file EF thereof as an authentication file.

Because of the file structure of each of the type-1 IC cards 4$a$1, the unlock information of each type-1 IC cards 4$a$1 has been stored as, for example, 6 byte-binary data (unlock data) in a third file EF thereof as a data read/write file.

In contrast, in the embodiment, the structure of the memory of each of the type-2 IC cards 4$a$2 has a plurality of sectors each of which is composed of a plurality of blocks.

In the embodiment, because each of the type-2 IC cards has the memory structure set forth above and requires no authentication, the unlock information of each type-2 IC card has been stored as, for example, a unique-format data (unlock data) in a block of one of the sectors as a data read/write file.

Note that each of the type-1 IC cards 4$a$1 has adopted T-DES (Triple Data Encryption Standard) as an authentic method.

In each IC card described above, the carrier signal transmitted from the reader/writer 2 is received by the antenna 41 so that the antenna 41 generates AC power therethrough by electromagnetic induction based on the received carrier signal. The AC power is rectified by the rectifying circuit of the IC 40 to generate DC power for operating the IC 40.

In addition, when part of the received carrier signal is modulated, the data (at least one command) superimposed on the carrier signal is detected and demodulated by the modem. The control circuit analyzes the demodulated data to execute operations based on the analyzed result, and writes data into the memory when needed.

When the at least one command is superimposed on the received carrier signal, the control unit causes the modem to modulate a return signal with response data corresponding to the at least one command. The control unit transmits the return signal with the response data from the antenna 41 to the reader/writer 2 so that, as described above, the return signal is received by the antenna 7, and the demodulator 7 8 amplifies the return signal received by the antenna 7.

Furthermore, the computer 3 is provided with a control circuit 11, a random access memory (RAM) 12 connected to the control circuit 11, and a read only memory (ROM) 13 connected thereto. The computer 3 is provided with a memory 14 connected to the control circuit 11, and an input unit 15 connected thereto. The computer 3 is provided with a display 16 connected to the control circuit 11, and a reader/writer (R/W) communication unit 17 connected thereto.

The ROM 13 has stored therein programs and/or data that the control circuit 11 requires to operate. The RAM 12 serves as a main working memory of the control circuit 11.

The memory 14 consists of, for example, a nonvolatile memory.

The memory 14 has stored therein an operating system (OS), a unlock information file UIF, and at least one application program AP.

The computer 3 is connected to a lock/unlock actuator UA that is mechanically coupled to the door. The lock/unlock actuator UA is configured to lock the door and unlock it based on control of the computer 3.

In the embodiment, the unlock information file UIF has registered therein the pieces of unlock information (unlock data) for the IC cards $4a1$ to $4an$, respectively.

The application program AP allows the control circuit 11 to carry out information processing that meets at least one application of the reader/writer 2 (user's need). Specifically, in the embodiment, the application program AP enables the control circuit 11 to determine whether to execute door unlock operations based on the unlock information file UIF and to control the lock/unlock actuator AC UA to unlock the door when the control circuit 11 determines that the door unlock operations should be carried out.

The input unit 15 allows computer's users to enter desirable instructions into the control circuit 11; these instructions cause the control circuit 11 to carry out the desired operations. The display 16 is operative to display data, which has been sent from the control circuit 11, on its screen in visual formats. The R/W communication unit 17 is configured to allow the control circuit 11 to communicate with the reader/writer 2 through the host communication unit 10.

The control circuit 11 loads the OS and the application program AP into the RAM 12 from the memory 14 based on, for example, the programs stored in the ROM 13. The application program AP loaded in the RAM 12 causes the control circuit 11 to run predetermined instructions based on the OS.

Specifically, the application program AP includes first instructions that cause the control circuit 11 to send a request to access information required to carry out the information processing (determining operations and door unlock operations).

In addition, the application program AP includes second instructions that cause the control circuit 11 to execute the information processing using the information corresponding to the request in response to the timing at which the information is taken from the reader/writer 2.

Figure 2:
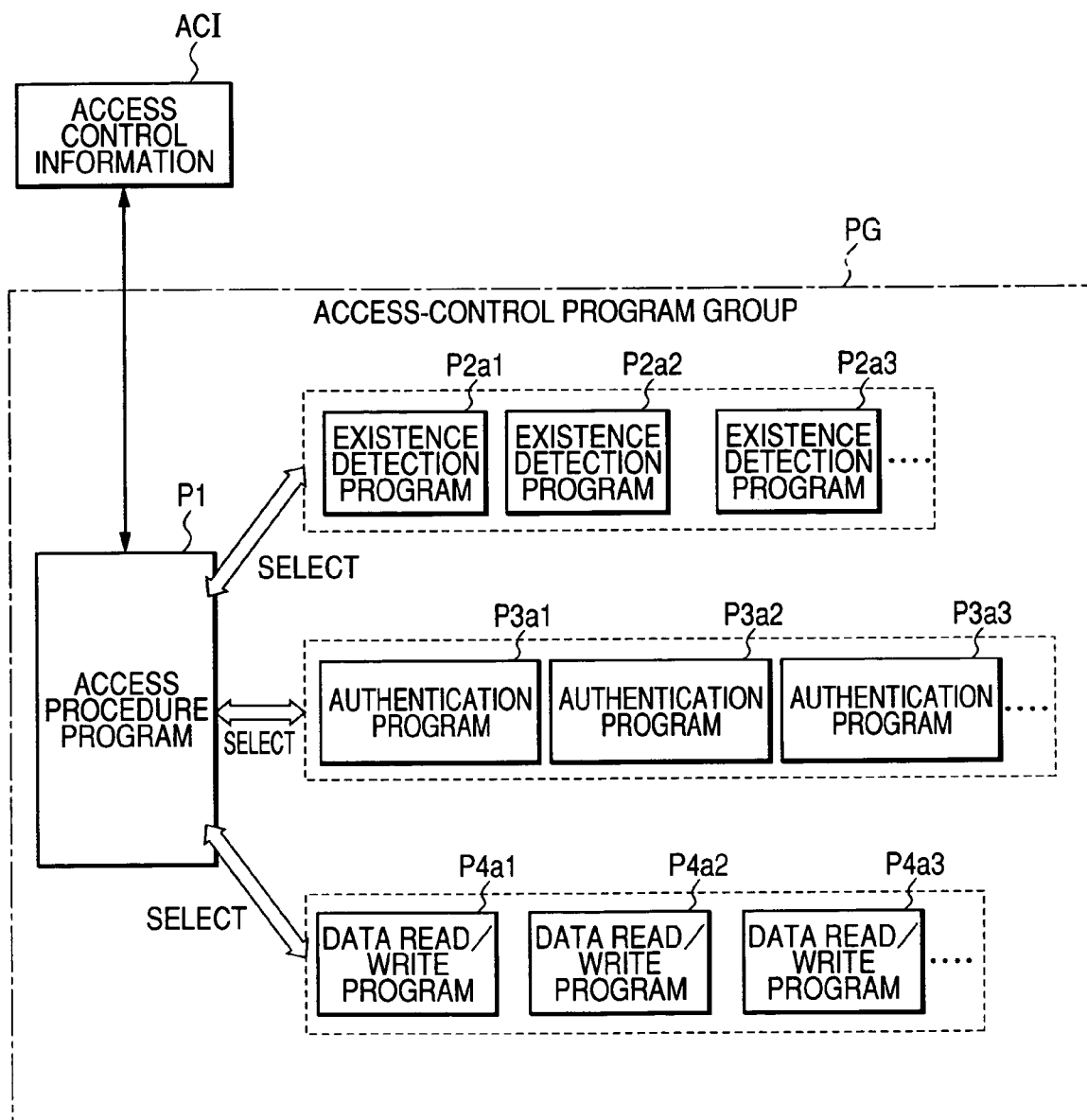
FIG. 2 is a view conceptually illustrating an example of the program structure of an access-control program group according to the embodiment of the present invention.

Furthermore, the access-control program group PG has, for example, a program structure conceptually illustrated in FIG. 2. Specifically, the access-control program group PG includes an access procedure program P1, existence detection programs $P2a1, P2a2, \ldots,$ and $P2an$, authentication programs $P3a1, P3a2, \ldots,$ and $P3an$, and data read/write programs $P4a1, P4a2, \ldots,$ and $P4an$ in a predetermined hierarchical priority.

Specifically, the existence detection programs $P2a1$ to $P2an$ correspond to the n types of the IC cards $4a1$ to $4an$, respectively, so that the existence detection programs $P2a1$ to $P2an$ allow the control circuit 5 to detect whether the IC cards $4a1$ to $4an$ exist in a predetermined communicable area of the reader/writer 2, respectively.

The authentication programs $P3a1$ to $P3an$ correspond to the n types of the IC cards $4a1$ to $4an$, respectively, so that the authentication programs $P3a1$ to $P3an$ allow the control circuit 5 to execute the authentication operations with respect to the IC cards $4a1$ to $4an$, respectively.

The data read/write programs $P4a1$ to $P4an$ correspond to the n types of the IC cards $4a1$ to $4an$, respectively, so that the data read/write programs $P4a1$ to $P4an$ allow the control circuit 5 to execute data read/write operations with respect to the IC cards $4a1$ to $4an$, respectively.

In the embodiment, for example, the existence detection programs $P2a1$ to $P2an$ are higher in priority than the authentication programs $P3a1$ to $P3an$, which are higher in priority than the data read/write programs $P4a1$ to $P4an$.

The access procedure program P1 allows the control circuit 5 to execute at least one of the n-access procedures PR1 to PRn to:

sequentially select one existence detection program in the first group, one authentication program in the second group, and one data read/write program in the third group based on the access control information ACI; and sequentially execute each selected program in each of the first to third groups based on the access control information ACI.

Figure 3:
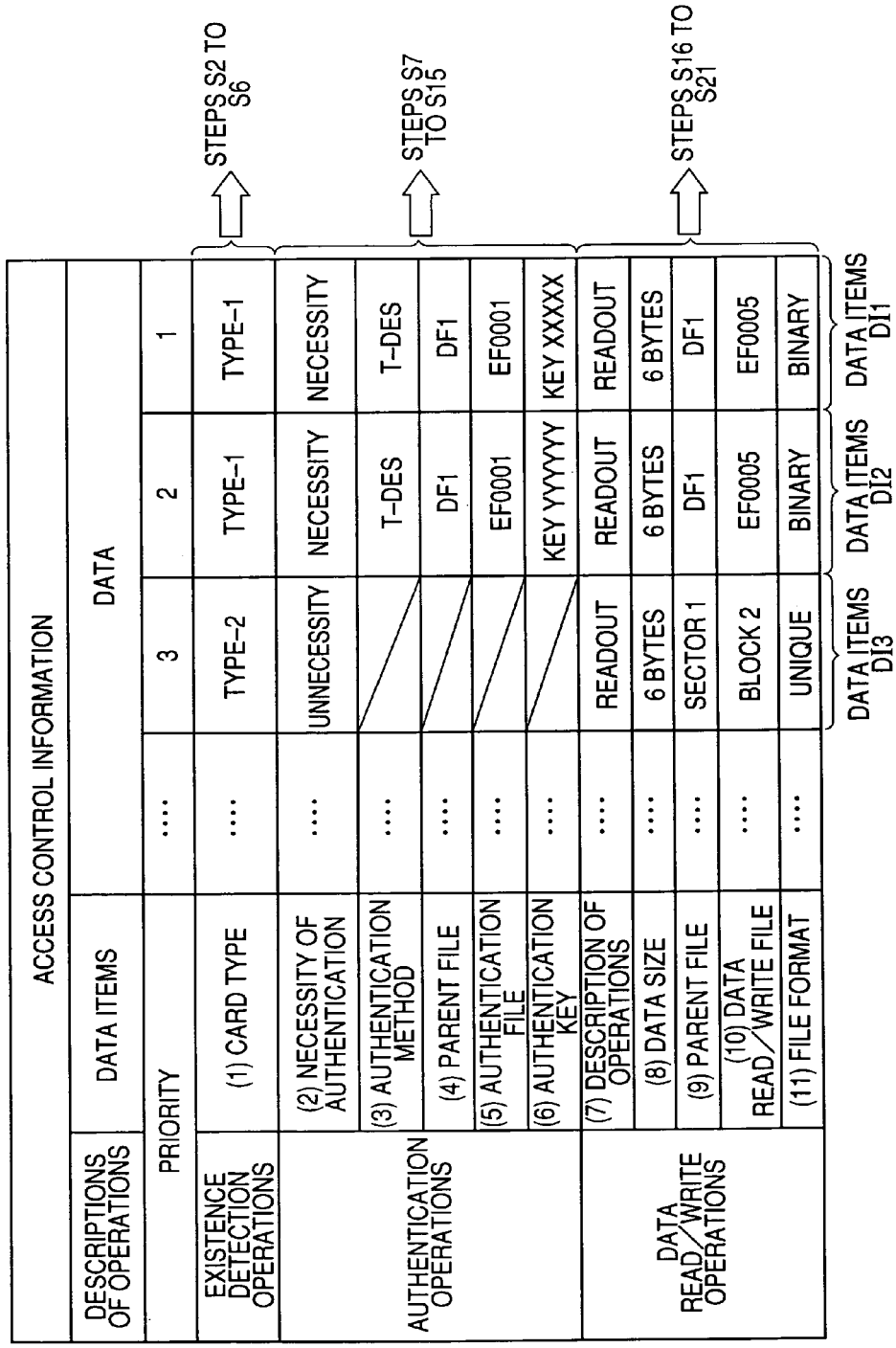
FIG. 3 is a view conceptually illustrating an example of the format of access control information stored in a memory of a reader/writer of the reader/writer system according to the embodiment of the present invention.

FIG. 3 conceptually illustrates an example of the file structure of the access control information file ACI in a table format.

Specifically, in the embodiment, data items of access information required to execute the n-access procedures PR1 to PRn have been prepared to be stored in the access control file ACI for each card. In addition, the data items of access information required to execute the n-access procedures PR1 to PRn are arranged in the order of the execution sequence of the n-access procedures PR1 to PRn.

For example, as illustrated in FIG. 3, the access information required to execute the access procedure PR1 for the first card in the same type-1 IC cards $4a1$ includes data items DI1 of (1) CARD TYPE indicative of the type of the first card, and (2) NECESSITY OF AUTHENTICATION indicative of whether authentication is required or not.

The data items DI1 also includes (3) AUTHENTICATION METHOD indicative of which authentication method is used, (4) PARENT FILE inactive of the location of the parent file of the authentication file, (5) AUTHENTICATION FILE indicative of the location of the authentication file, and (6) AUTHENTICATION KEY indicative of the authentication key as the authentication information stored in the authentication file.

The data items DI1 further includes (7) DESCRIPTIONS OF OPERATIONS indicative of whether data readout operation or data write operation is carried out, (8) DATA SIZE indicative of the data size of the data read/write file, and (9) PARENT FILE indicative of the location of the parent file of the data read/write file.

The data items DI1 still further includes (10) DATA READ/WRITE FILE indicative of the location (address) of the data read/write file, and (11) FILE FORMAT indicative of which file format is used for the data read/write file.

In addition, the access information required to execute the access procedure PR1 for the second card in the same type-1 IC cards 4a1 include data items DI2 of (1) to (11) like the data items DI1.

Moreover, the access information required to execute the access procedure PR2 for one card in the same type-2 IC cards 4a2 includes data items DI3 of (1), (2), and (7) to (11) because no authentication is required.

Moreover, data representing:
(A) existence detection operations corresponding to the existence detection programs P2a1 to P2an;
(B) the authentication operations corresponding to the authentication programs P3a1 to P3an; and
(C) the data read/write operations corresponding to the data read/write programs 4a1 to 4an
has been stored in the access control information ACI such that the operations (A) to (C) are associated with the corresponding data items of the access information (see FIG. 3).

In the embodiment, the data items DI1, DI2, DI3, . . . , of the access information for respective cards have been prioritized. Specifically, as illustrated in FIG. 3, the priority of the data items, for example data items DI1, DI2, of the type-1 IC cards to that of the data items of the access information of the type-n IC cards are ranked such that the lower the type number "k" (1≤k≤n) is, the higher the priority is.

Moreover, in the same type of IC cards, the priorities of the data items have been determined.

For example, the data items DI1 of the first card in the same type-1 IC cards is the highest in priority therein, and the next priority is assigned to the data times DI2 of the second card in the same type-1 IC cards.

The sequence priority numbers have been assigned to the data items DI1, DI2, DI3, . . . , of the access information based on their priorities, respectively. For example, in FIG. 3, the sequential priority number "1" is assigned to the data items DI1 of the access information corresponding to the first card in the same type-1 IC cards, and the sequential priority number "2" is assigned to the data items DI2 of the access information corresponding to the second card in the same type-1 IC cards. In addition, the sequential priority number "3" is assigned to the data items DI3 of the access information corresponding to the one card in the same second type-2 IC cards.

Next, operations of the reader/writer system 1 according to the embodiment will be described hereinafter with reference to FIGS. 2 to 4.

Figure 4:
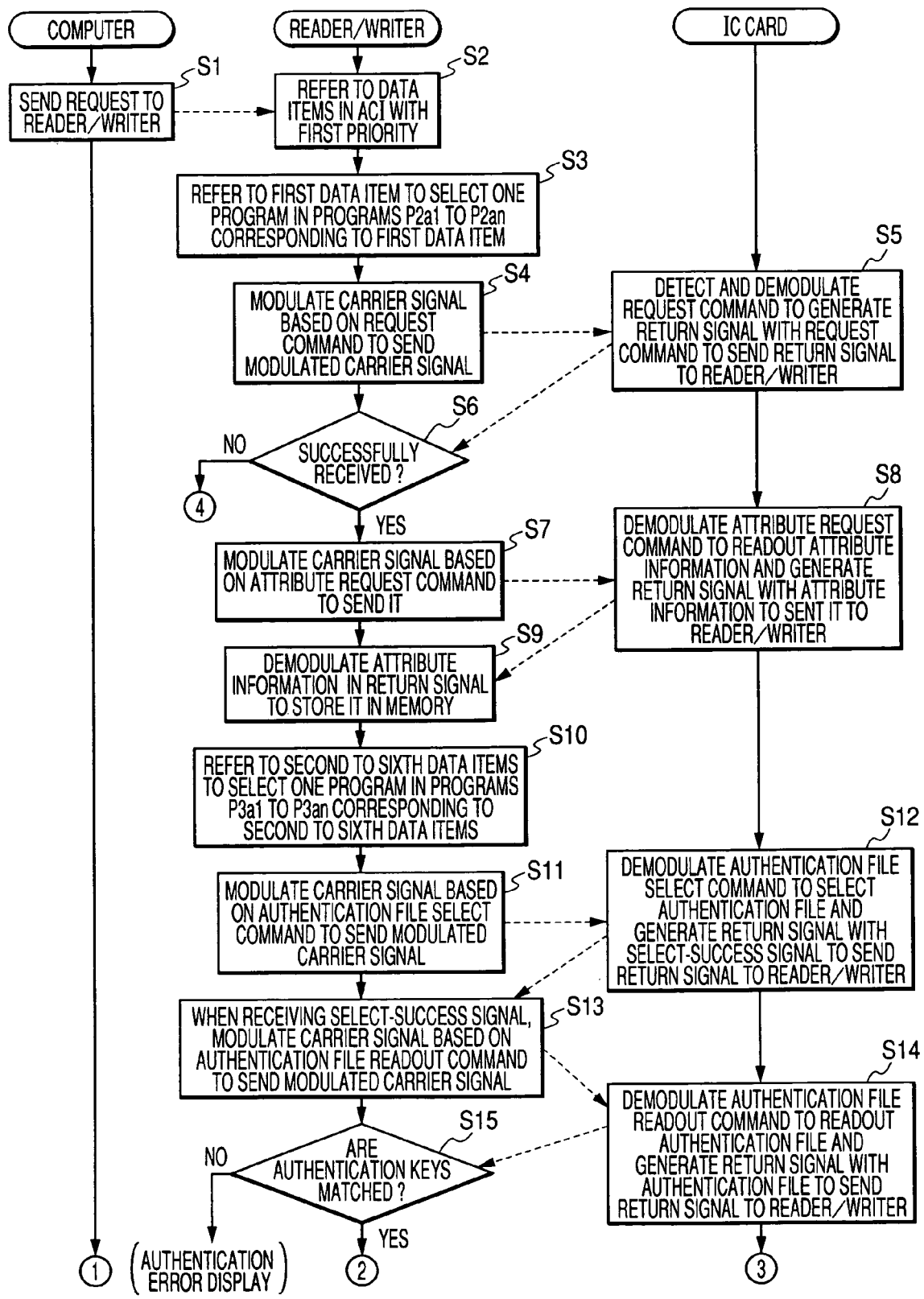
FIG. 4 is a flowchart schematically illustrating an example of operations of a control circuit of a noncontact IC card and that of the reader/writer according to the embodiment of the present invention.

The application program AP causes the control circuit 11 of the computer 3 to send the request to access the information required to carry out the authentication operations and the door unlocking operations to the reader/writer 2 through the R/W communication unit 17 in step S1 of FIG. 4. When the request is sent from the computer 3 to the reader/writer 2, the access procedure program P1 of the reader/writer 2 causes the control circuit 5 to refer to the data items DI1 of the access information to which the sequential priority number "1" is assigned in step S2.

The access procedure program P1 causes the control circuit 5 to refer to the first (1) data item "CARD TYPE" in the data items DI1, such as "TYPE-1". Thereafter, the access procedure program P1 causes the control circuit 5 to select one of the existence detection programs P2a1 to P2an; this selected program, such as the existence detection program P2a1, corresponds to the first data item of "TYPE-1" in the data items DI1 in step S3.

The existence detection program P2a1 corresponding to the type-1 IC cards 4a1 causes the control circuit 5 and the modulator 6 to modulate the carrier signal at a given timing based on a request command, thereby sending the modulated carrier signal with the request command through the antenna 7 in step S4.

When the first card of the type-1 IC cards 4a1 is contacted close to the reader/writer 2 to be located at a communicable area of the reader/writer 2, the modem of the IC 40 of the first card of the type-1 IC cards 4a1 detects and demodulates the request command superimposed on the carrier signal. The control circuit of the IC 40 of the first card of the type-1 IC cards 4a1 analyzes the request command to execute operations based on the analyzed result to generate a return signal with a request response corresponding to the request command, thereby sending the return signal to the reader/writer 2 in step S5.

After transmission of the modulated carrier signal with the request command, the existence detection program P2a1 causes the control circuit 5 to determine whether a return signal has been successfully received in step S6.

For example, in step S6, when a predetermined period of time has elapsed after the transmission of the modulated carrier signal without receiving any return signals, the existence detection program P2a1 causes the control circuit 5 to determine that the return signal has not been successfully received (step S6→NO), causing the control circuit 5 to the processing in step S30 hereinafter.

Moreover, when the return signal is received before elapse of the predetermined period of time after the transmission of the modulated carrier signal, the demodulator 8 demodulates the request response superimposed on the return signal so that the control circuit 5 determines whether the demodulated request response corresponds to the sent request command in step S6.

When it is determined that the demodulated request response does not correspond to the sent request command (step S6→NO), the existence detection program P2a1 causes the control circuit 5 to shift to step S30 described hereinafter.

In contrast, when it is determined that the demodulated request response corresponds to the sent request command (step S6→YES), the existence detection program P2a1 causes the control circuit 5 and the modulator 6 to modulate the carrier signal at a given timing based on an attribute request command. The existence detection program P2a1 causes the control circuit 5 and the modulator 6 to send the modulated carrier signal with the attribute request command through the antenna 7 in step S7.

The modem of the IC 40 of the first card of the type-1 IC cards 4a1 detects and demodulates the attribute request command superimposed on the carrier signal. The control circuit of the IC 40 of the first card of the type-1 IC cards 4a1 analyzes the attribute request command to execute operations based on the analyzed result to readout the attribute information from the memory. The control circuit of the IC 40 of the first card of the type-1 IC cards 4a1 generates a return signal with the attribute information, thereby sending it to the reader/writer 2 in step S8.

The existence detection program P2a1 causes the control circuit 5 and the demodulator 8 to receive the return signal to demodulate the attribute information superimposed on the return signal, thereby storing it in the memory 9 in step S9 so that the IC card existence detection operations based on the existence detection program P2a1 have been completed.

In response to the successful completion of the existence detection program P2a1, the access procedure program P1 causes the control circuit 5 to refer to the second (2) data item "necessity of authentication" to the sixth (6) data item "authentication key" in the data items DI1. Thereafter, the access procedure program P1 causes the control circuit 5 to select one of the authentication programs P3a1 to P3an; this selected program, such as the authentication program P3a1, corresponds to the second to sixth data items in the data items DI1 in step S10.

The authentication program P3a1 causes the control circuit 5 and the modulator 6 to modulate the carrier signal at a given timing based on an authentication-file select command. The authentication-file select command allows the control circuit of the first card to select the authentication file stored in the memory of the first card based on at least the third (3) and fourth (4) data items "PARENT FILE" and "AUTHENTICATION FILE" of "DF1" and "EF0001".

The authentication program P3a1 causes the control circuit 5 and the modulator 6 to send the modulated carrier signal with the authentication-file select command through the antenna 7 in step S11.

The modem of the IC 40 of the first card of the type-1 IC cards 4a1 detects and demodulates the authentication-file select command superimposed on the carrier signal. The control circuit of the IC 40 of the first card of the type-1 IC cards 4a1 analyzes the authentication-file select command to select the authentication file in plurality of other files stored in the memory based on the third (3) and fourth (4) data items. The control circuit of the IC 40 of the first card of the type-1 IC cards 4a1 generates a return signal with a select-success signal, thereby sending it to the reader/writer 2 through the antenna 41 in step S12.

The authentication program P3a1 causes the demodulator 8 and the control circuit 5 to receive the return signal. When the select-success signal is detected in the return signal, the authentication program P3a1 causes the control circuit 5 and the modulator 6 to modulate the carrier signal at a given timing based on an authentication-file readout command, thereby sending the modulated carrier signal with the authentication-file readout command through the antenna 7 in step S13.

The modem of the IC 40 of the first card of the type-1 IC cards 4a1 detects and demodulates the authentication-file readout command superimposed on the carrier signal. The control circuit of the IC 40 of the first card of the type-1 IC cards 4a1 analyzes the authentication-file readout command to readout the selected authentication file stored in the memory. The control circuit of the IC 40 of the first card of the type-1 IC cards 4a1 generates a return signal with the readout authentication file, thereby sending it to the reader/writer 2 in step S14.

When the return signal is transmitted from the first card of the type-1 IC cards 4a1, the authentication program P3a1 causes the demodulator 8 and the control circuit 5 to receive the return signal through the antenna 7 and to read out an authentication key stored in the authentication file. Subsequently, the authentication program P3a1 causes the control circuit 5 to determine whether the authentication key "XXXXXX" as the sixth (6) data item of the data items DI1 is matched with the authentication key stored in the authentication file in step S15.

When it is determined that the authentication key "XXXXXX" is matched with the authentication key stored in the authentication file (the determination in step S15 is YES), the authentication operations based on the authentication program P3a1 have been completed. In contrast, when it is determined that the authentication key "XXXXXX" is not matched with the authentication key stored in the authentication file (the determination in step S15 is NO), the authentication program P3a1 causes, for example, the control circuit 5 to send information representing an error of authentication to the computer 3 through the host communication unit HCU 10. This results in that the information representing the error of authentication is displayed on the display 16 by the control circuit 11 of the computer 3.

In response to the successful completion of the authentication program P3a1, the access procedure program P1 causes the control circuit 5 to refer to the seventh (7) data item "DESCRIPTION OF OPERATIONS" to eleventh (11) data item "FILE FORMAT" in the data items DI1. Thereafter, the access procedure program P1 causes the control circuit 5 to select one of the data read/write programs P4a1 to P4an; this selected program, such as the data read/write program P4a1, corresponds to the seventh to eleventh data items in the data items DI1 in step S16.

The data read/write program P4a1 causes the control circuit 5 and the modulator 6 to modulate the carrier signal at a given timing based on a data read/write file select command. The data read/write file select command allows the control circuit of the first card to select the data read/write file in the other files stored in the memory of the first card based on at least the seventh (7) to the tenth (10) data items in step S17.

The control circuit of the IC 40 of the first card of the type-1 IC cards 4a1 generates a return signal with a select-success signal, thereby sending it to the reader/writer 2 through the antenna 41 in step S18.

The data read/write program P4a1 causes the demodulator 8 and the control circuit 5 to receive the return signal. When the select-success signal is detected in the return signal, the data read/write program P4a1 causes the control circuit 5 and the modulator 6 to modulate the carrier signal at a given timing based on a data readout command, thereby sending the modulated carrier signal with the data readout command through the antenna 7 in step S19.

The modem of the IC 40 of the first card of the type-1 IC cards 4a1 detects and demodulates the data readout command superimposed on the carrier signal. The control circuit of the IC 40 of the first card of the type-1 IC cards 4a1 analyzes the data readout command to read out the 6-byte binary data (unlock data) stored in the selected data read/write file. The control circuit of the IC 40 of the first card of the type-1 IC cards 4a1 generates a return signal with the binary data, thereby sending it to the reader/writer 2 in step S20.

When the return signal is transmitted from the first card, the data read/write program P4a1 causes the control circuit 5 to receive the return signal. Subsequently, the program P4a1 causes the control circuit 5 to read out the 6-byte binary data (unlock data) from the return signal, thereby sending the 6-byte binary unlock data to the computer 3 through the host communication unit 17 in step S21.

The application program PA causes the control circuit 11 of the computer 3 to receive the 6-byte binary unlock data through the R/W communication unit 17. Subsequently, the application program PA causes the control circuit 11 to determine whether the received unlock data is matched with the unlock data corresponding to the first card of the type-1 IC cards 4a1 stored in the unlock information file UIF in step S22.

When it is determined that the received unlock data is matched with the unlock data corresponding to the first card of the type-1 IC cards 4a stored in the unlock information file UIF, the determination in step S22 is YES. In this case, the application program PA causes the control circuit 11 to send a door unlock command to the lock/unlock actuator UA so that the lock/unlock actuator UA releases the lock of the door of the room in step S23.

In contrast, when it is determined that the received unlock data is not matched with the unlock data corresponding to the first card of the type-1 IC cards 4a stored in the unlock information file UIF, the determination in step S22 is NO. In this case, for example, the application program PA causes the control circuit 11 to display a visual message indicative of "NOT UNLOCK" on the screen of the display 16 in step S24.

Figure 5:
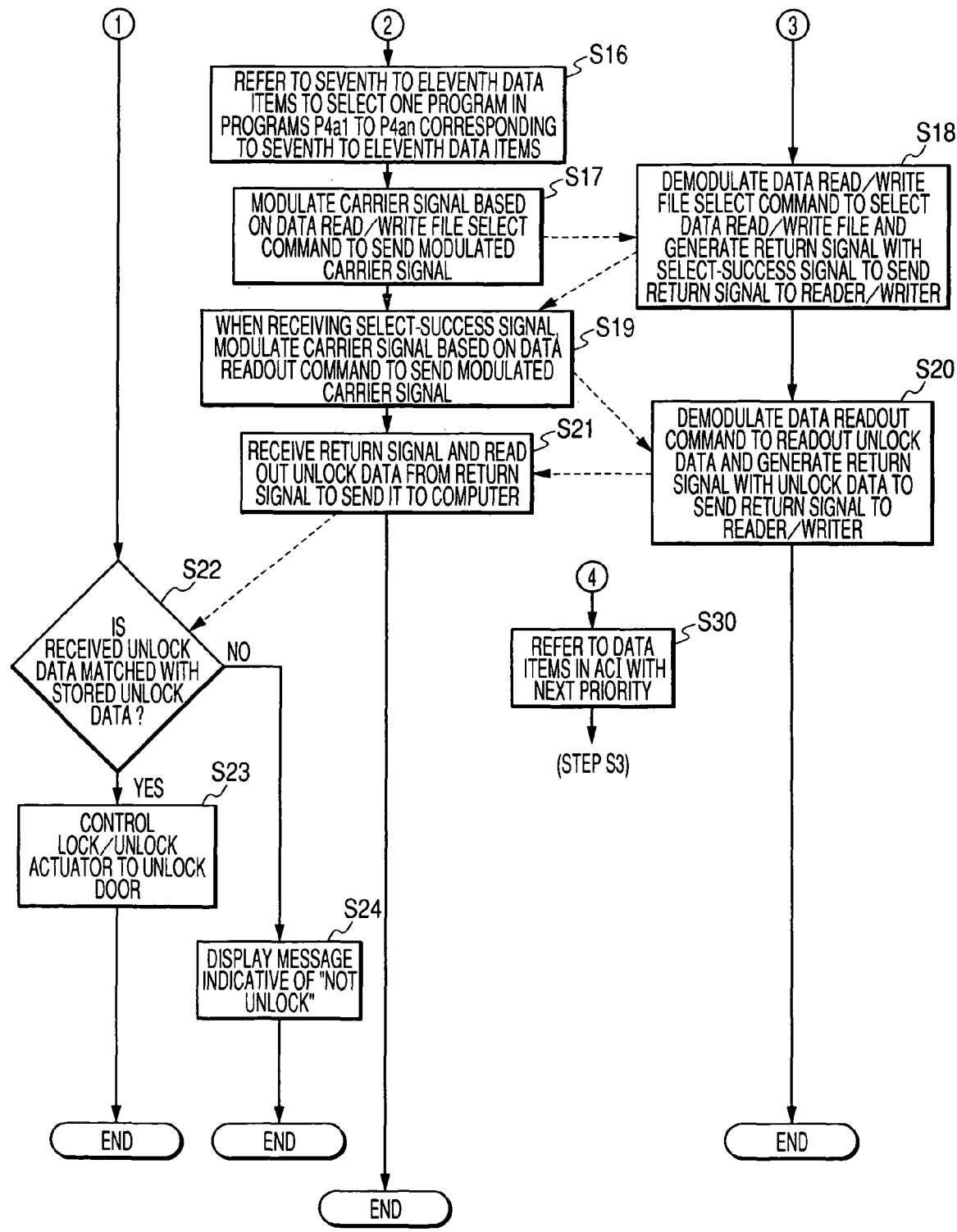
FIG. 5 is a sequence diagram schematically illustrating an example of operations of the control circuit of the noncontact IC card and that of the reader/writer according to the embodiment of the present invention.

On the other hand, when a card except for the type-1 IC cards 4a1 is located at the communication area of the reader/writer 2, the return signal has not been successfully received in step S6. In this case, the access procedure program P1 causes the control circuit 5 to refer to the data items DI2 of the access information to which the next sequential priority number, such as "2" is assigned in step S30 of FIG. 5.

Thereafter, the access program group PG causes the control circuit 5 to execute the operations in steps S3, S4, S6, S7, S9 to S11, S13, S15 to S17, S19, and S21 set forth above based on the data items DI2 of the access information with the next sequential priority number of "2".

In the embodiment, in the course of establishing a sequence of access procedures with respect to at least one target IC card with a type based on the access control information ACI, the access procedure program P1 sequentially select one program in each of the program groups in the order from the highest priority group to the lowest priority group. This allows the control circuit 5 to specify one program in each of the program groups, which corresponds to the type of the target IC card.

Specifically, in the embodiment, the access procedure program P1 causes the control circuit 5 to sequentially execute the existence detection programs P2a1 to P2an in the predetermined order, such as the ascending order, until one of the existence detection programs P2a1 to P2an corresponding to the type of IC cards being located at the communication area of the reader/writer 2 (see steps S2 to S4, S6, and S30).

In addition, it is assumed that the request indicative of specifying at least one type of IC cards is sent from the computer 3 to the reader/writer 2 in step S1. In this assumption, the access procedure program P1 can cause the control circuit 5 to repeatedly execute one of the existence detection programs P2a1 to P2an, which corresponds to the at least one-specified type of IC cards, until the processing of the control circuit 5 in step S6 is YES, in other words, until an IC card with the at least one specified type is located at the communication area of the reader/writer 2.

This allows the same access procedure based on the access-control program group PG to obtain information stored in any type of IC cards.

Moreover, the embodiment can simplify the application program AP such that the application program AP at least only includes a procedure for sending a request to the reader/writer 2 and that for meeting at least one application of the reader/writer 2 based on information required to execute at least one application independently of any type of IC cards. This makes it possible to save the storage area of the memory 14 in which the application program AP is stored, and makes it unnecessary to provide a plurality of application programs for plural types of IC cards.

In addition, in the embodiment, the control circuit 5 serves as a managing unit for changing the configuration of the access control information ACI and/or that of the access-control program group PG.

When receiving configuration information sent from the control circuit 11 of the computer 3, on the basis of the configuration information, the control circuit 5 is operative to:
  add data to the access control information ACI and/or that of the access-control program group PG;
  delete data from the access control information ACI and/or that of the access-control program group PG; or
  change the value of at least one data items stored in the access control information ACI and/or that in a program of the access-control program group PG.

Specifically, as illustrated in FIG. 1, when receiving at least one data item of the access control information input from the input unit 15 of the computer 3, the control circuit 5 executes a managing function FN1 of writing the input data item into the access control information file ACI. Similarly, when receiving at least one access-control program input from the input unit 15 of the computer 3, the control circuit 5 executes the function FN1 of writing the input access-control program into the access-control program group PG.

Moreover, when receiving a command to delete at least one data item stored in the access control information file ACI input from the input unit 15 of the computer 3, the control circuit 5 executes the function FN1 of deleting the corresponding data item from the access control information file ACI. Similarly, when receiving a command to delete at least one program stored in the application program group PG input from the input unit 15 of the computer 3, the control circuit 5 executes the function FN1 of deleting the corresponding program from the application program group PG. This allows at least one unnecessary data item and/or program to be deleted from the access information file ACI and/or the access-control program group PG.

When receiving information indicative of priorities of the existence detection programs in the access-control program group PG, sent from the control circuit 11 of the computer 3, the control circuit 5 executes a function FN2 of setting the input priorities to the existence detection programs, respectively. This results in that the control circuit 5 executes the existence detection programs such that the higher in priority the existence detection programs are, the higher the frequencies of the existence detection programs are. In addition, when plural types of IC cards are located at the communicable area of the reader/writer 2, the control circuit 5 priorities to access one of the plural types of IC cards; this one of the plural types of IC cards corresponds to the highest existence detection programs in priority in all of the existence detection programs.

In the embodiment, because the access-control program group PG and the access control information ACI are stored in the single memory 9, it is possible to simplify the structure of the reader/writer system 1 and to increase the processing speed of the control circuit 5.

In addition, in the embodiment, providing the access-control program group PG and the access control information ACI in the reader/writer 2 allows ensuring the confidentiality of highly-confidential information in the access-control program group PG and the access control information ACI, such as the access procedures and/or the authentication keys. This makes it possible to improve the security of the reader/writer system 1 and the processing speed of the control circuit 5.

Note that the access-control program group PG and the access control information ACI can be stored in the memory 14 of the computer 3 as drivers. This modification also allows the object of the present invention to be realized. In addition, the application program AP, the access-control program group PG and the access control information ACI, which are provided by at least one provider, can be maintained in, for example, a provider's server on the Internet to which the computer 3 is accessible through the Internet. The application program AP, the access-control program group PG and the access control information ACI can be downloaded from the server to the computer 3 and/or the reader/writer 2.

The application program AP, the access-control program group PG and the access control information ACI can be stored in a storage media accessible by the computer 3. This allows the computer 3 to access to the storage media so as to read out at least one of the application program AP, the access-control program group PG and the access control information ACI from the storage media. This permits the reader/writer 2 to access to the computer 3 so as to read at least one of the application program AP, the access-control program group PG and the access control information ACI, thereby storing it in the memory 9.

IC tags or other memory devices can be used as noncontact information carriers in place of the IC cards.

Note that installing the application program AP in the reader/writer 2 allows omission of the computer 3 from the reader/writer system 1.

While there has been described what is at present considered to be the embodiment and modifications of the present invention, it will be understood that various modifications which are not described yet may be made therein, and it is intended to cover in the appended claims all such modifications as fall within the true spirit and scope of the invention.

What is claimed is:

1. A contactless communication system operative to communicate with at least one of plural types of noncontact information carriers, the plural types of noncontact information carriers having different access procedures from type to type, the contactless communication system comprising:
    a single modulator;
    an information processing unit operative to run an application program to send an access request indicating one of the plural types of noncontact information carriers;
    a first storage unit configured to store a group of access control programs such that each of the access control programs is associated with a corresponding one type of the different access procedures from type to type;
    a second storage unit configured to store access reference information including a plurality of sets of data items, each of the sets of data items being required to execute a corresponding one of the group of access control programs and associated with a corresponding one of the different access procedures from type to type; and
    a program execution unit configured to reference, in response to the access request sent from the information processing unit, the access reference information to select at least one set of data items in the plurality of sets of data items based on a result of the reference, and to select at least one program in the group of access control programs based on the result of the, the selected at least one set of data items and selected at least one program corresponding to at least one of the different access procedures, the at least one of the different access procedures corresponding to the one of the plural types of noncontact information carriers indicated by the access request,
    the program execution unit being configured to execute the selected at least one program in the group of access control programs based on the selected at least one set of data items, the program execution unit being configured to communicate, through the single modulator, with the one of the plural types of noncontact information carriers in accordance with the executed at least one program based on the selected at least one set of data items.

2. A contactless communication system according to claim 1, wherein the access request causes the execution unit to execute a plurality of different access operations, the group of access control programs includes a plurality of groups of access control programs such that the groups of access control programs corresponding to the different access operations, respectively, and the program execution unit is configured to:
    select one program in each of the groups of access control programs;
    establish a sequence of access procedures in the different access procedures based on the selected programs of the respective groups of access control programs; and
    execute the sequence of access procedures based on the access reference information.

3. A contactless communication system according to claim 1, wherein the data items for a corresponding one of the different access procedures from type to type are arranged in an order of execution sequence of each of the different access procedures from type to type.

4. A contactless communication system according to claim 2, wherein the plurality of groups of access control programs have a hierarchical structure with hierarchical priorities, and the program execution unit is configured to select the one program in each of the groups of access control programs in an order from the highest group in priority to the lowest group in priority in a course of establishing the sequence of access procedures.

5. A contactless communication system according to claim 2, wherein the plurality of groups of access control programs include a group of existence detection programs for detecting at least one of the plural types of noncontact information carriers, the at least one of the plural types of noncontact information carriers being located at a communicable area of the contactless communication system, the existence detection programs corresponding to the plural types of noncontact information carriers, respectively, and
    wherein the plurality of groups of access control programs have a hierarchical structure with hierarchical priorities, and the group of existence detection programs has the highest priority in the plurality of groups of access control programs.

6. A contactless communication system according to claim 5, wherein the program execution unit is configured to sequentially select one existence detection program in the group of existence detection programs to execute the selected existence detection program in a predetermined order until the selected one existence detection program corresponds to the at least one of the plural types of noncontact information carriers located at the communicable area of the contactless communication system.

7. A contactless communication system according to claim 5, wherein, when receiving a request indicative of specifying at least one type of the noncontact information carriers, the program execution unit is configured to select one of the existence detection programs to repeatedly execute the selected existence detection program until a noncontact information carrier with the at least one specified type is located at the communication area of the contactless communication system, the one of the existence detection programs corresponding to the at least one specified type of noncontact information carriers.

8. A contactless communication system according to claim 2, further comprising a managing unit configured to change at least one of a configuration of the group of access control programs and that of the access reference information, the change of the managing unit including at least one of:
- addition of an item of information to the access reference information;
- addition of a program to the group of access control programs;
- deletion of an item of information in the access reference information;
- deletion of a program in the group of access control programs;
- change of a value of at least one piece of information in the access reference information; and
- change of a value in a program of the group of access control programs.

9. A contactless communication system according to claim 8, wherein the plurality of groups of access control programs include a group of existence detection programs for detecting at least one of the plural types of noncontact information carriers, the at least one of the plural types of noncontact information carriers being located at a communicable area of the contactless communication system, the existence detection programs corresponding to the plural types of noncontact information carriers, respectively, and wherein, when receiving information indicative of priorities of the existence detection programs, the managing unit is configured to set the received priorities of the existence detection programs, respectively, and the program execution unit is configured to execute the existence detection programs such that the higher in priority the existence detection programs are, the higher the frequencies of the existence detection programs are.

10. A contactless communication system according to claim 8, wherein the plurality of groups of access control programs include a group of existence detection programs for detecting at least one of the plural types of noncontact information carriers, the at least one of the plural types of noncontact information carriers being located at a communicable area of the contactless communication system, the existence detection programs corresponding to the plural types of noncontact information carriers, respectively, and wherein, when executing one of the existence detection programs to detect at least two noncontact information carriers with different types, respectively, the program execution unit is configured to execute the sequence of access procedures for one of the at least two noncontact information carriers, the one of the at least two noncontact information carriers being higher in priority than the other thereof.

11. A contactless communication system operative to communicate with at least one of plural types of noncontact information carriers, the plural types of noncontact information carriers having different access procedures from type to type, the contactless communication system comprising:
- a microcomputer operative to run an application program to send an access request indicating one of the plural types of noncontact information carriers; and
- a reader/writer, the reader/writer including:
- a single modulator;
- a first storage unit configured to store a group of access control programs such that each of the access control programs is associated with a corresponding one type of the different access procedures from type to type;
- a second storage unit configured to store access reference information including a plurality of sets of data items, each of the sets of data items being required to execute a corresponding one of the group of access control programs and associated with a corresponding one of the different access procedures from type to type; and
- a program execution unit configured to reference, in response to the access request sent from the information processing unit, the access reference information to select at least one set of data items in the plurality of sets of data items based on a result of the reference, and to select at least one program in the group of access control programs based on the result of the reference the selected at least one set of data items and selected at least one program corresponding to at least one of the different access procedures, the at least one of the different access procedures corresponding to the one of the plural types of noncontact information carriers indicated by the access request,
- the program execution unit being configured to execute the selected at least one program in the group of access control programs based on the selected at least one set of data items, the program execution unit being configured to communicate, through the single modulator, with the one of the plural types of noncontact information carriers in accordance with the executed at least one program based on the selected at least one set of data items.

12. A contactless communication system according to claim 11, wherein an access request causes the program execution unit to execute a plurality of different access operations, the group of access control programs includes a plurality of groups of access control programs such that the groups of access control programs corresponding to the different access operations, respectively, and the program execution unit is configured to:
- select one program in each of the groups of access control programs;
- establish a sequence of access procedures based on the selected programs of the respective groups of access control programs; and
- execute the sequence of access procedures based on the access reference information.

13. A contactless communication system according to claim 11, wherein the data items for a corresponding one of the different access procedures from type to type are arranged in an order of execution sequence of each of the different access procedures from type to type.

14. A contactless communication system according to claim 12, wherein the plurality of groups of access control programs have a hierarchical structure with hierarchical priorities, and the program execution unit is configured to select the one program in each of the groups of access control programs in an order from the highest group in priority to the lowest group in priority in a course of establishing the sequence of access procedures.

15. A contactless communication method of communicating with at least one of plural types of noncontact information carriers, the plural types of noncontact information carriers having different access procedures from type to type, the method comprising:
- providing a single modulator;
- causing an information processing unit to send an access request indicating one of the plural types of noncontact information carriers;
- storing a group of access control programs such that each of the access control programs is associated with a corresponding one type of the different access procedures from type to type;
- storing access reference information including a plurality of sets of data items, each of the sets of data items being required to execute a corresponding one of the group of access control programs and associated with a corresponding one of the different access procedures from type to type;

referring, in response to the access request sent from the information processing unit, to the access reference information to select at least one set of data items in the plurality of sets of data items based on a result of the reference, and to select at least one program in the group of access control programs based on the result of the referring, the selected at least one set of data items and selected at least one program corresponding to at least one of the different access procedures, the at least one of the different access procedures corresponding to the one of the plural types of noncontact information carriers indicated by the access request; and executing the selected at least one program in the group of access control programs based on the selected at least one set of data items to thereby communicate, through the single modulator, with the one of the plural types of noncontact information carriers in accordance with the executed at least one program based on the selected at least one set of data items.

16. A contactless communication system according to claim 1, wherein:
the information processing unit and the program execution unit are controlled by separate control circuits,
the program execution unit selects different programs in the group of access control programs depending on the one of the plural types of noncontact information carriers indicated by the access request.

17. A contactless communication system according to claim 11, wherein:
the program execution unit is controlled separately from the microcomputer,
the program execution unit selects different programs in the group of access control programs depending on the one of the plural types of noncontact information carriers indicated by the access request.

18. A contactless communication method according to claim 15, wherein:
different programs in the group of access control programs are selected depending on the one of the plural types of noncontact information carriers indicated by the access request.

* * * * *